(12) United States Patent
Khanka et al.

(10) Patent No.: US 8,358,577 B1
(45) Date of Patent: Jan. 22, 2013

(54) USING WIRELESS LINKS TO OFFLOAD BACKHAUL COMMUNICATIONS

(75) Inventors: Bhagwan Singh Khanka, Lenexa, KS (US); Sachin R. Vargantwar, Overland Park, KS (US); Maulik K. Shah, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 232 days.

(21) Appl. No.: 12/635,261

(22) Filed: Dec. 10, 2009

(51) Int. Cl.
*G06F 11/07* (2006.01)
(52) U.S. Cl. .......... 370/221; 370/229; 370/328
(58) Field of Classification Search .......... 370/216–221, 370/229–232, 235, 236, 237, 328
See application file for complete search history.

(56) References Cited

U.S. PATENT DOCUMENTS

| | | | |
|---|---|---|---|
| 6,687,503 B1 | 2/2004 | Porter et al. | |
| 6,934,298 B2 * | 8/2005 | Bentley | 370/447 |
| 7,321,571 B2 | 1/2008 | Schnack et al. | |
| 2004/0062214 A1 | 4/2004 | Schnack et al. | |
| 2007/0265013 A1 | 11/2007 | Labedz | |
| 2008/0008092 A1 * | 1/2008 | Wang et al. | 370/235 |
| 2008/0076406 A1 | 3/2008 | Chen et al. | |
| 2009/0213730 A1 * | 8/2009 | Zeng et al. | 370/217 |

* cited by examiner

*Primary Examiner* — Michael Thier
*Assistant Examiner* — Curtis A Alia (57) ABSTRACT

What is disclosed is a method of operating a communication system. The communication system includes wireless access nodes and a network control system, where user devices and the wireless access nodes communicate over wireless links, and the wireless access nodes and the network control system communicate over individually associated backhaul links. The method includes transferring forward communications in a forward direction from the network control system to a first one of the wireless access nodes over a forward link portion of a first backhaul link associated with the first wireless access node, and transferring reverse communications in a reverse direction from the first wireless access node to the network control system over a reverse link portion of the first backhaul link. The method also includes monitoring forward performance of the forward link portion and monitoring reverse performance of the reverse link portion, and identifying a second of the wireless access nodes to assist the first wireless access node. If the forward performance of the forward link portion exceeds a forward threshold, then the method includes instructing the first wireless access node to initiate a backup wireless link between the first wireless access node and the second wireless access node, and if the reverse performance of the reverse link portion exceeds a reverse threshold, then the method includes instructing the second wireless access node to initiate the backup wireless link between the first wireless access node and the second wireless access node. The method also includes using the backup wireless link to offload communications of the first backhaul link.

20 Claims, 7 Drawing Sheets

| BASE STATION | BACKHAUL UTILIZATION | | POSSIBLE DONOR BASE STATIONS |
|---|---|---|---|
| | FWD LINK | REV LINK | |
| 310 | 50% | 50% | 311, 312 |
| 311 | 95% | 95% | 310, 312, 313 |
| 312 | 10% | 60% | 310, 311, 313, 314 |
| 313 | 80% | 30% | 311, 312, 314, 315 |
| 314 | 30% | 80% | 312, 313, 315 |
| 315 | 20% | 90% | 313, 314 |

TABLE 500

FIGURE 5

USING WIRELESS LINKS TO OFFLOAD BACKHAUL COMMUNICATIONS

TECHNICAL FIELD

Aspects of the disclosure are related to the field of communications, and in particular, using wireless links to offload backhaul communications in wireless communication networks.

TECHNICAL BACKGROUND

Wireless communication systems typically include wireless access nodes, such as base stations, which provide wireless access to communication services for user devices over wireless links. A typical wireless communication system includes many wireless access nodes to provide wireless access across a geographic region, with individual wireless coverage areas associated with each wireless access node. The wireless access nodes exchange user communications and overhead communications with a core network of the wireless communication system over backhaul communication links to control nodes. The control nodes typically coordinate handoffs of user devices moving between coverage areas of different wireless access nodes, control the operation of the wireless access nodes, and route communications, among other functions.

However, the backhaul communication links can often become heavily loaded when many users receive wireless access from a single wireless access node, or when a few users consume a large amount of bandwidth. Additionally, faults in the backhaul communication links can occur, such as cable faults or equipment failure. Unfortunately, when the backhaul communication link of a wireless access node experiences a fault, wireless access to communication services through that wireless access node may be reduced and user devices may experience poor performance.

Overview

What is disclosed is a method of operating a communication system. The communication system includes wireless access nodes and a network control system, where user devices and the wireless access nodes communicate over wireless links, and the wireless access nodes and the network control system communicate over individually associated backhaul links. The method includes transferring forward communications in a forward direction from the network control system to a first one of the wireless access nodes over a forward link portion of a first backhaul link associated with the first wireless access node, and transferring reverse communications in a reverse direction from the first wireless access node to the network control system over a reverse link portion of the first backhaul link. The method also includes monitoring forward performance of the forward link portion and monitoring reverse performance of the reverse link portion, and identifying a second of the wireless access nodes to assist the first wireless access node. If the forward performance of the forward link portion exceeds a forward threshold, then the method includes instructing the first wireless access node to initiate a backup wireless link between the first wireless access node and the second wireless access node, and if the reverse performance of the reverse link portion exceeds a reverse threshold, then the method includes instructing the second wireless access node to initiate the backup wireless link between the first wireless access node and the second wireless access node. The method also includes using the backup wireless link to offload communications of the first backhaul link.

What is also disclosed is a communication system. The communication system includes wireless access nodes and a network control system. User devices and the wireless access nodes are configured to communicate over wireless links, and the wireless access nodes and the network control system are configured to communicate over individually associated backhaul links. The network control system is configured to transfer forward communications in a forward direction from the network control system to a first one of the wireless access nodes over a forward link portion of a first backhaul link associated with the first wireless access node, and the first wireless access node is configured to transfer reverse communications in a reverse direction from the first wireless access node to the network control system over a reverse link portion of the first backhaul link. The network control system is configured to monitor forward performance of the forward link portion and monitor reverse performance of the reverse link portion. The network control system is also configured to identify a second of the wireless access nodes to assist the first wireless access node. If the forward performance of the forward link portion exceeds a forward threshold, then the network control system is configured to instruct the first wireless access node to initiate a backup wireless link between the first wireless access node and the second wireless access node to offload communications of the first backhaul link, and if the reverse performance of the reverse link portion exceeds a reverse threshold, then the network control system is configured to instruct the second wireless access node to initiate the backup wireless link between the first wireless access node and the second wireless access node to offload communications of the first backhaul link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
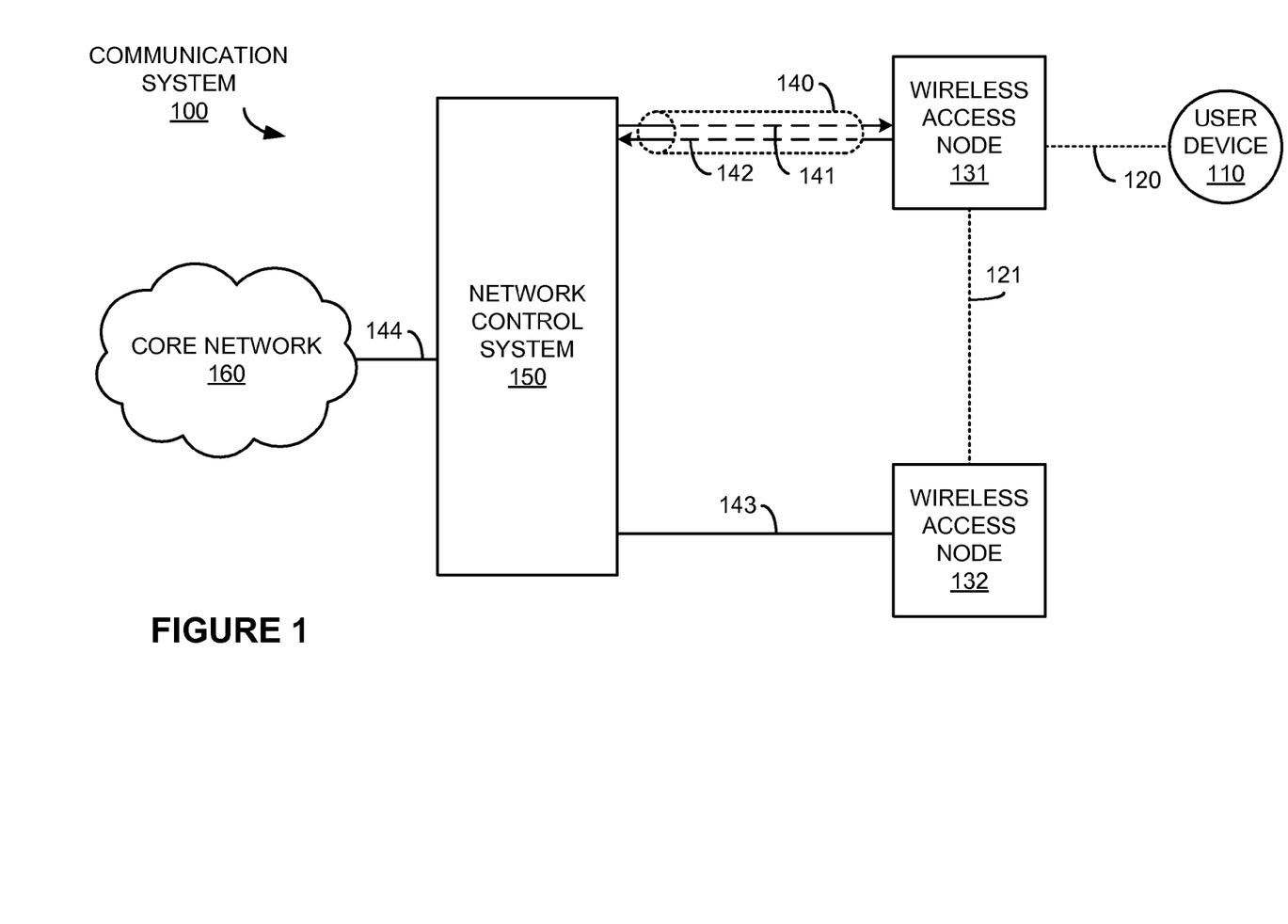
FIG. 1 is a system diagram illustrating a communication system.

FIG. 1 is a system diagram illustrating communication system 100.

Communication system 100 includes user device 110, wireless access nodes 131-132, network control system 150, and core network 160. User device 110 and wireless access node 131 communicate over wireless link 120. Wireless access node 131 and network control system 150 communicate over backhaul link 140. Wireless access node 132 and network control system 150 communicate over backhaul link 143. Network control system 150 and core network 160 communicate over link 144.

In FIG. 1, user device 110 receives wireless communication service from wireless access node 131 over wireless link 120. The communications for wireless communication service are exchanged with user device 110 through wireless access node 131, and are initially routed over backhaul link 140 by wireless access node 131 to network control system 150 and core network 160. Backhaul link 140 is shown with forward link portion 141 for transferring forward communications in a forward direction from network control system 150 to wireless access node 131. Backhaul link 140 is also shown with reverse link portion 142 for transferring reverse communications in a reverse direction to network control system 150 from wireless access node 131. Wireless link 120 could also include forward and reverse link portions. Although only user device 110 is shown in FIG. 1, it should be understood that a different number of user devices could receive communication service from wireless access nodes 131-132.

Figure 2:
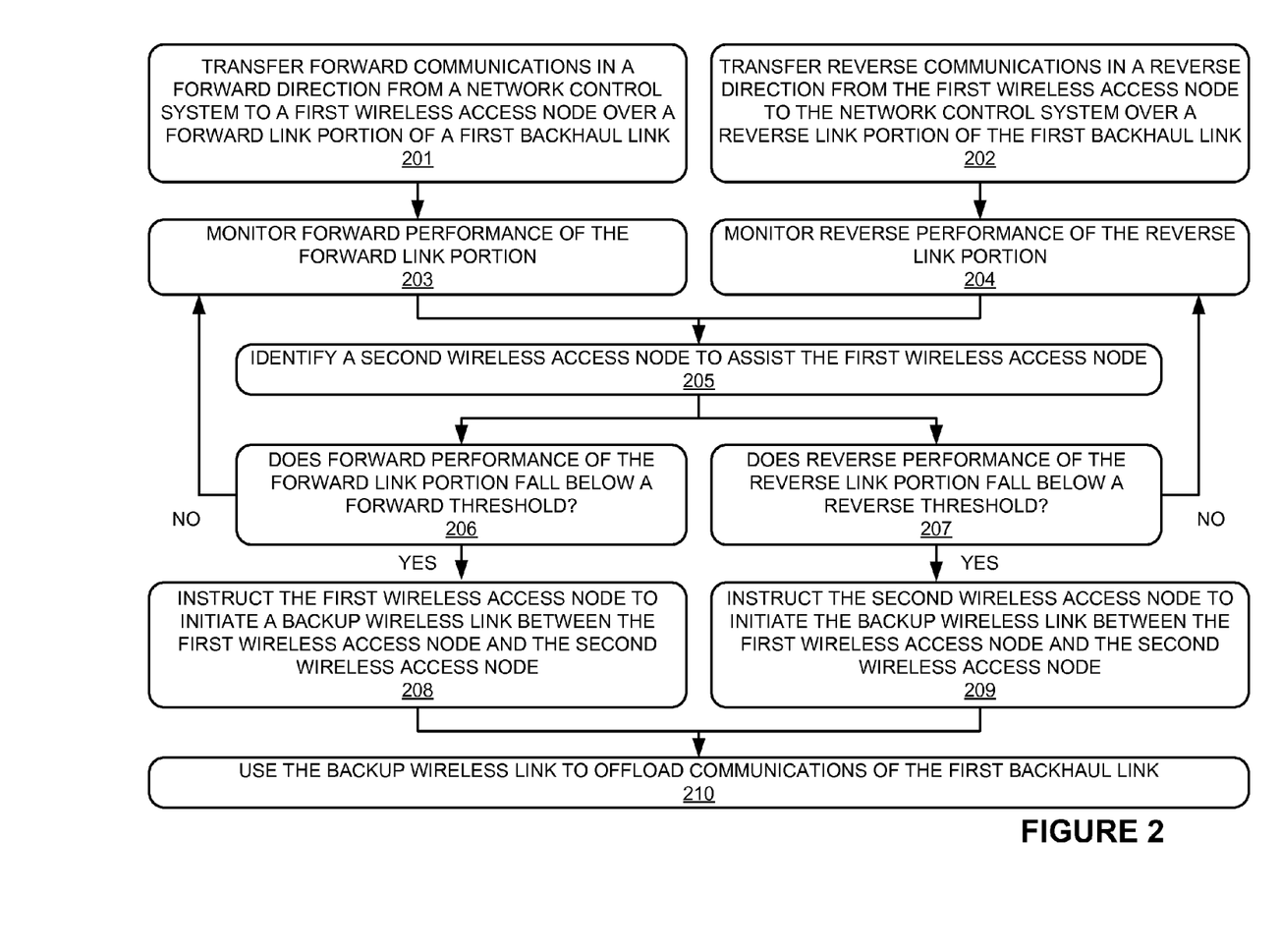
FIG. 2 is a flow diagram illustrating a method of operation of a communication system.

FIG. 2 is a flow diagram illustrating a method of operation of communication system 100. The operations in FIG. 2 are referenced herein parenthetically. In FIG. 2, network control system 150 transfers (201) forward communications in a forward direction from network control system 150 to wireless access node 131 over forward link portion 141 of backhaul link 140. Wireless access node 131 transfers (202) reverse communications in a reverse direction from wireless access node 131 to network control system 150 over reverse link portion 142 of backhaul link 140. Network control system 150 monitors forward performance (203) of forward link portion 141 and monitors reverse performance (204) of reverse link portion 142. Network control system 150 could monitor performance of the forward and reverse portions of backhaul link 140 by monitoring many different metrics. For example, communication traffic levels, available bandwidths, delays, utilization, or other performance metrics could be monitored. Network control system 150 also identifies (205) a second wireless access node to assist wireless access node 131. Network control system 150 could identify a second wireless access node based upon backhaul utilization, a number of associated user devices, geography, distance, or other criteria of other wireless access nodes to select a suitable wireless access node to assist wireless access node 131. In this example, network control system 150 identifies wireless access node 132 to assist wireless access node 131.

Network control system 150 determines (206) if forward performance of forward link portion 141 falls below a forward threshold. As indicated above, forward performance could include a variety of performance metrics. For example, network control system 150 could determine if the available bandwidth of forward link portion 141 falls below a threshold bandwidth level. If the forward performance of forward link portion 141 falls below the forward threshold, then network control system 150 instructs (208) wireless access node 131 to initiate a backup wireless link between wireless access node 131 and the wireless access node identified to assist wireless access node 131, namely wireless access node 132. In this example, wireless access node 131 initiates backup wireless link 121 with wireless access node 132. Network control system 150 and wireless access node 131 then use (210) backup wireless link 121 to offload communications of backhaul link 140. At least a portion of the communications which would have been transferred over forward link portion 141 of backhaul link 140 are then transferred over backhaul link 143, through wireless access node 132, and over backup wireless link 121. These offloaded communications could be used to provide communication service to user device 110 or wireless access node 131. In some examples, if the forward performance of forward link portion 141 falls below the forward threshold, then forward and reverse communications of backhaul link 140 are offloaded over backhaul link 143 and backup wireless link 121.

Network control system 150 determines (207) if reverse performance of reverse link portion 142 falls below a reverse threshold. As indicated above, the performance could include a variety of performance metrics. For example, network control system 150 could determine if the available bandwidth of reverse link portion 142 falls below a threshold bandwidth level. If the reverse performance of reverse link portion 142 falls below the reverse threshold, then network control system 150 instructs (209) the wireless access node identified to assist wireless access node 131 to initiate a backup wireless link with wireless access node 131. Thus, in this example, wireless access node 132 initiates backup wireless link 121 with wireless access node 131. Network control system 150 and wireless access node 131 then use (210) backup wireless link 121 to offload communications of backhaul link 140. At least a portion of the communications which would have been transferred over reverse link portion 142 of backhaul link 140 are then transferred over backhaul link 143, through wireless access node 132, and over backup wireless link 121. These offloaded communications could be used to provide communication service to user device 110 or wireless access node 131. In some examples, if the reverse performance of reverse link portion 142 falls below the reverse threshold, then reverse and forward communications are offloaded over backhaul link 143 and backup wireless link 121.

It should be understood that although performance of the forward or reverse link portions of backhaul link 140 are described as falling below a threshold in this example, other thresholds or crossing directions could be employed, such as performance exceeding a threshold. As a further example, upper thresholds of traffic levels or link utilizations could be used instead of lower thresholds of traffic throughput or available bandwidth. Although one backup wireless link 121 is shown in FIG. 1, it should be understood that separate backup wireless links could be used for offloading forward and reverse communications.

Figure 3:
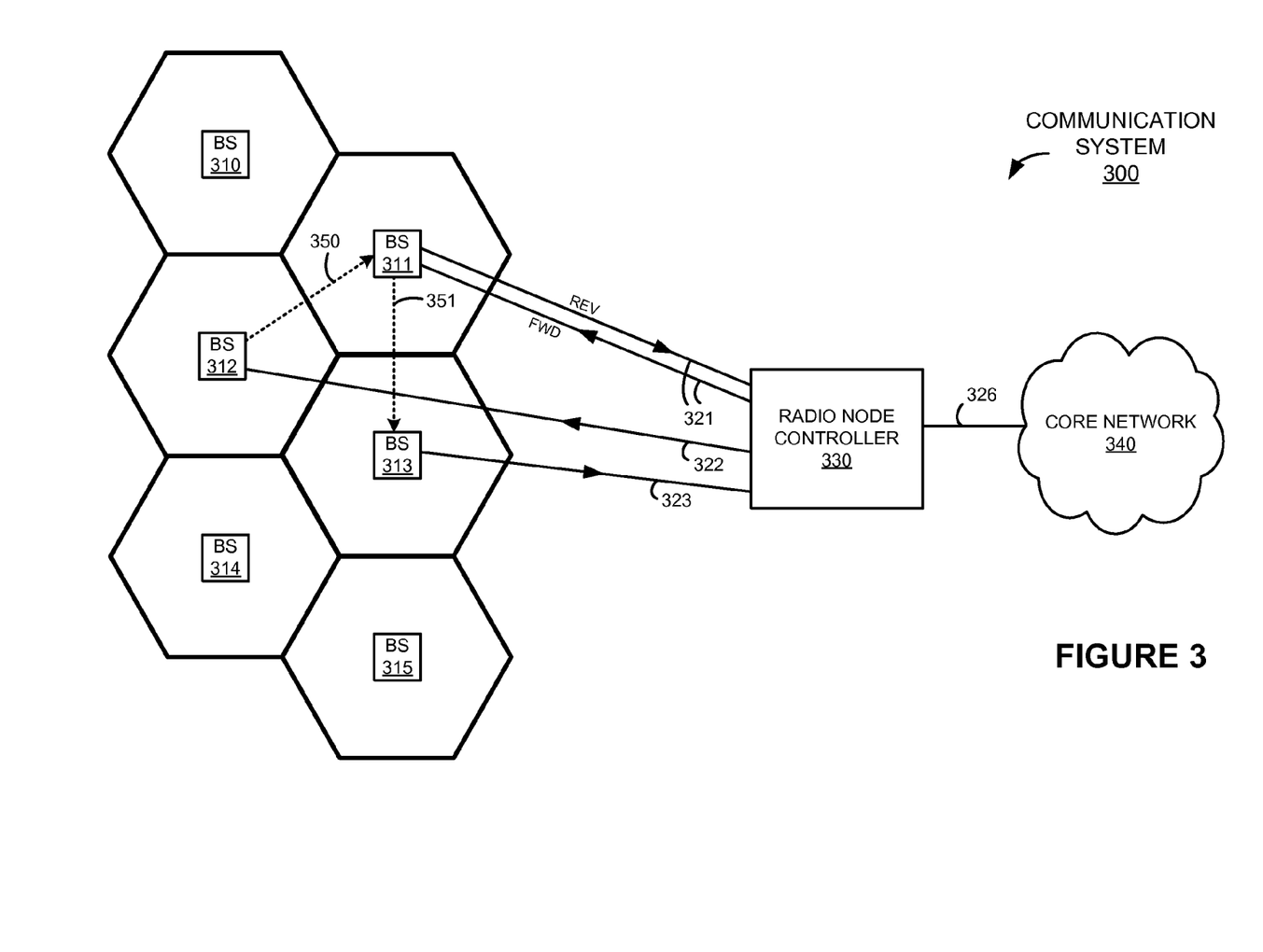
FIG. 3 is a system diagram illustrating a communication system.

FIG. 3 is a system diagram illustrating communication system 300. Communication system 300 includes base stations (BS) 310-315, radio node controller (RNC) 330, core network 340. Each of BS 310-315 can communicate with RNC 330 over backhaul links 320-325, respectively. Backhaul links 320, 324, and 325 are not shown in FIG. 3 for clarity. RNC 330 and core network 340 communicate over link 326. In this example, backhaul links 320-325 are T1 links used as backhaul links between BTS 310-315 and RNC 330. Link 326 is an optical metropolitan area network (MAN) link between RNC 350 and core network 340. Backhaul link 321 is shown including both forward link and reverse link portions, as described for link 140 in FIG. 1, although other configurations could be used. Although links 320, 322-323, and 350-351 are each shown as a single line in FIG. 3, they could incorporate forward and reverse link portions. Also, it should be understood that in other examples, additional links, equipment, or intermediary communication systems could be employed in links 320-326. Wireless links 350-351 each employ the Evolution Data Optimized (EV-DO) wireless protocol in this example.

Base stations (BS) 310-315 are wireless access nodes, and each could include communication equipment for a wireless access site, such as transceiver equipment, antennas, power sources, tower structures, among other equipment. As shown in FIG. 3, each base station 310-315 has a limited geographic range over which wireless access is provided to user devices. The limited range is indicated by the hexagonal-shaped wireless coverage areas associated with BS 310-315 in FIG. 3. Although a hexagonal region defining the coverage areas is shown in FIG. 3, it should be understood that the coverage areas could be of other shapes and configurations, as determined by geographic features, empirical data, radio frequency (RF) conditions, the associated equipment, or by other factors, including combinations thereof. Although not shown for clarity, BS 310-315 each provide wireless communication access for user devices, such as wireless communication devices, that may be located within each respective coverage area.

Core network 340 is a core network of a wireless communications provider in this example. Core network 340 could include further base stations, routers, gateways, controller systems, processing systems, carrier equipment, or other communication equipment. Radio node controller (RNC) 330 includes equipment to monitor and control the operations of BS 310-315. RNC 330 also includes equipment to route communications between BS 310-315 and core network 340, as well as equipment to control and coordinate handoffs of wireless communication devices between various wireless access nodes, such as BS 310-315. RNC 330, in this example, can also monitor performance of backhaul links 320-325, and provide instructions to BS 310-315 to initiate backup wireless links.

In FIG. 3, user devices receive wireless communication service from base stations 310-315 over wireless links. The communications for wireless access that is provided to user devices in the coverage area of base station 311 are initially routed over backhaul link 321 between base station 311 and RNC 330. Backhaul link 321 is shown with a forward link portion for transferring forward communications in a forward direction from RNC 330 to base station 311. Backhaul link 321 is also shown with reverse link portion for transferring reverse communications in a reverse direction to RNC 330 from base station 311.

Figure 4:
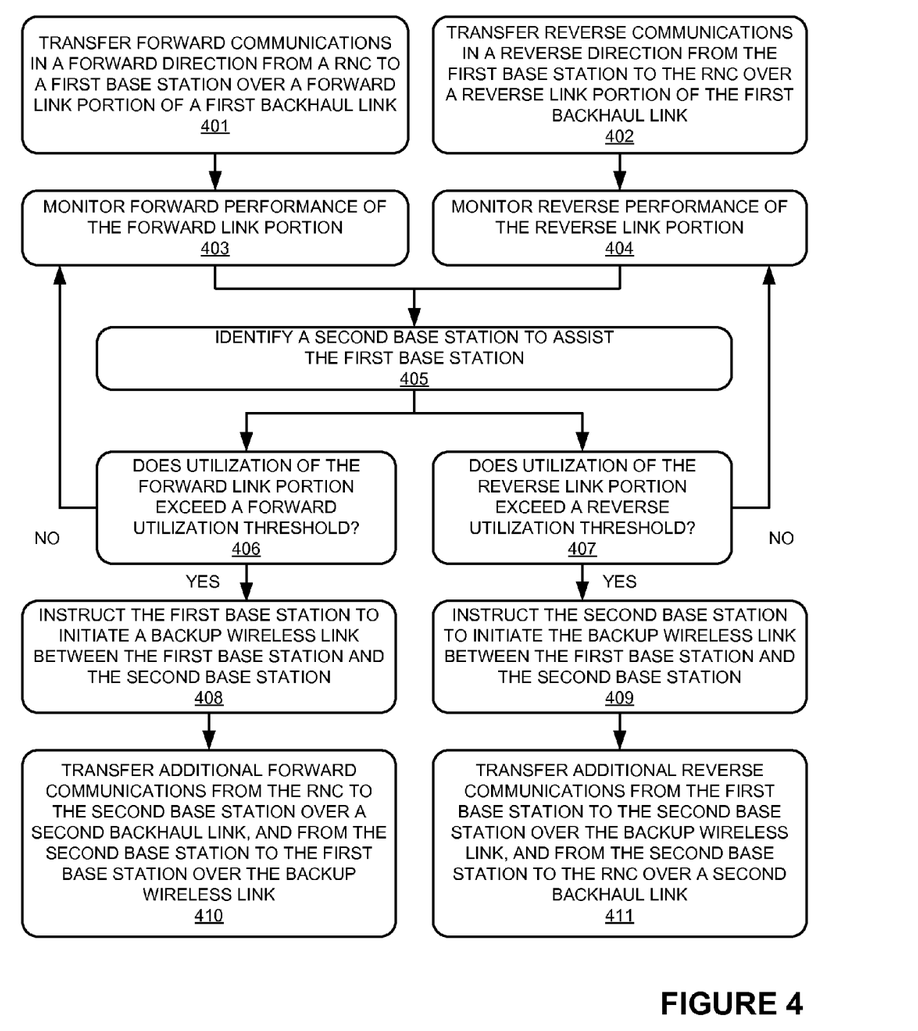
FIG. 4 is a flow diagram illustrating a method of operation of a communication system.

FIG. 4 is a flow diagram illustrating an operation of communication system 300. The operations in FIG. 4 are listed herein parenthetically. In FIG. 4, RNC 330 transfers (401) forward communications in a forward direction from RNC 330 to BS 311 over a forward link portion of backhaul link 321. BS 311 transfers (402) reverse communications in a reverse direction from BS 311 to RNC 330 over a reverse link portion of backhaul link 321. In this example, the forward and reverse communications are used to provide communication service to user devices within the coverage area of BS 311 over wireless links using the EV-DO wireless protocol. The forward and reverse communications could include user communications and overhead communications for the user devices, as well as control and overhead communications for the operation of BS 311 by RNC 330.

RNC 330 monitors (403) the forward performance of the forward link portion of backhaul link 321 and monitors (404) the reverse performance of the reverse link portion of backhaul link 321. In some examples, RNC 330 probes the performance of backhaul link 321 by periodically exchanging data, packets, or other communications over backhaul link 321. Base station 311 could echo probes transferred by RNC 330 back to RNC 330 over backhaul link 321 so that RNC 330 could monitor both forward and reverse link performance. Other techniques of probing performance of backhaul link 321 could also be used, such as monitoring traffic levels of network ports associated with the forward and reverse link portions of backhaul link 321, monitoring available bandwidths, data transfer delays, percentage utilizations, or other performance metrics. RNC 330 could also probe performance at preselected times or periods, such as every minute during normal operation, only during peak utilization times, at specific times of the day, days of the week, or at other periods. In other examples, as the level of utilization of backhaul link 321 increases, the performance monitoring period could be modified to allow for more rapid determination of when performance reaches a threshold level. In yet further examples, BS 311 could monitor the performance of backhaul link 321 and report the performance information to RNC 330.

RNC 330 identifies (405) at least a second base station to assist BS 311. The base station to assist BS 311, or donor base station, could be selected from many possible base stations. RNC 330, in typical examples, considers different factors when identifying a donor base station. These factors could include backhaul utilizations of the possible donor base stations, a number of associated user devices for each possible donor base station, geographic features around BS 311 or the possible donor base stations, distances of each of the possible donor base stations from BS 311, or other criteria. In other examples, the base station to assist BS 311 could be selected based upon an expected performance the donor base station backhaul link, where RNC 330 also monitors the backhaul link performance of possible donor base stations in addition to monitoring the backhaul link for BS 311. In yet further examples, the base station to assist BS 311 could be selected based upon expected performance of a backup wireless link employed between the selected donor base station and BS 311. RNC 330 could determine expected performance of a wireless link by establishing test wireless links between base stations and monitoring performance. RNC 330 could probe forward performance of each of the test wireless links by transferring sample forward data from each possible donor base station to BS 311, and probe reverse performance of each of the test wireless links by transferring sample reverse data from BS 311 to each of the possible donor base stations. RNC 330 could also consider present performance of user devices associated with each base station, traffic levels or utilization of the wireless resources and equipment of possible base stations, or RF conditions, among other factors.

Figure 5:
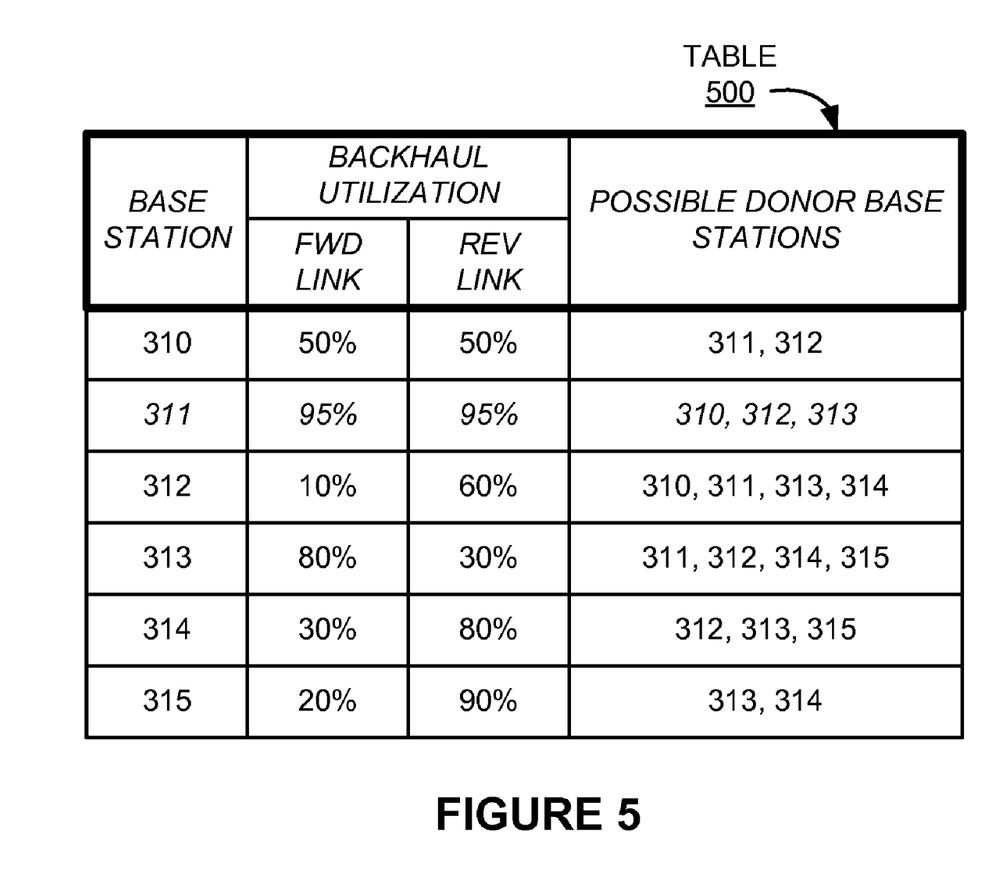
FIG. 5 is a table illustrating example backhaul performance data.

In this example, RNC 330 monitors the backhaul link utilization of BS 311 and of the possible donor base stations. The utilizations of the forward link portions and reverse link portions of each of backhaul links 320-325 are shown in table 500 of FIG. 5. In table 500, each base station of FIG. 3 is listed in rows with a corresponding forward link and reverse link backhaul utilization percentage. The backhaul utilization percentages are merely illustrative in this example, and other values or performance factors could be used. A list of possible donor base stations is also listed in each row associated with base stations 310-315. In this example, the possible donor base stations listed are selected based upon proximity of wireless coverage areas. Table 500 lists the possible donor base stations for BS 311 as BS 310, BS 312, and BS 313. As shown in FIG. 3, these possible donor base stations have coverage areas adjacent to the coverage area of BS 311. Each of BS 310, BS 312, and BS 313 have different backhaul utilization percentages for their associated forward and reverse link portions. The donor base station could then be selected from BS 310, BS 312, and BS 313 based upon the backhaul utilization, depending upon whether BS 311 needs assistance with forward link traffic or reverse link traffic. It should be understood that identifying a base station to assist BS 311 could occur before or after determining that BS 311 may benefit from assistance.

RNC 330 then determines (406) if utilization of the forward link portion of backhaul link 321 exceeds a forward utilization threshold. As shown in table 500 of FIG. 5, the utilization of the forward link portion of backhaul link 321 is 95%. If the forward utilization threshold is exceeded, such as if the threshold is 92%, then RNC 330 instructs (408) BS 311 to initiate a backup wireless link between BS 311 and the selected donor base station. Table 500 lists the forward link backhaul utilization of possible donor base stations as 50% for BS 310, 10% for BS 312, and 80% for BS 313. Based upon the forward link backhaul utilization of possible donor base stations, BS 312 has the lowest forward link backhaul utilization. Thus, in this example, RNC 330 selects BS 312 as the donor base station, and instructs BS 311 to initiate backup wireless link 350 with BS 312. Additional forward communications from RNC 330 can then be transferred (410) from RNC 330 over the forward link portion of backhaul link 322, through BS 312, and over a forward link portion of backup wireless link 350. Thus, at least a portion of the communications transferred over the forward link portion of backhaul link 321 can be transferred over a different pathway. In examples where the forward link portion of backhaul link 321 experiences a fault, such as a cable or equipment failure, service to BS 311 can be maintained.

RNC 330 also determines (407) if utilization of the reverse link portion of backhaul link 321 exceeds a reverse utilization threshold. As shown in table 500 of FIG. 5, the utilization of the reverse link portion of backhaul link 321 is 95%. If the reverse utilization threshold is exceeded, such as if the threshold is 92%, then RNC 330 instructs (409) the selected donor base station to initiate a backup wireless link between BS 311 and the donor base station. Table 500 lists the reverse link backhaul utilization of possible donor base stations as 50% for BS 310, 60% for BS 312, and 30% for BS 313. Based upon the reverse link backhaul utilization of possible donor base stations, BS 313 has the lowest reverse link backhaul utilization. Thus, in this example, RNC 330 selects BS 313 as the donor base station, and instructs BS 313 to initiate backup wireless link 351 with BS 311. It should be noted that the donor base station initiates a backup wireless link in the reverse link example, whereas BS 311 initiates a backup wireless link in the forward link example. Additional reverse communications from RNC 330 can then be transferred (411) from BS 311 over a reverse link portion of backup wireless link 351, through BS 313, to RNC 330 over the reverse link portion of backhaul link 323. Thus, at least a portion of the communications transferred over the reverse link portion of backhaul link 321 can be transferred over a different pathway. In examples where the reverse link portion of backhaul link 321 experiences a fault, such as a cable or equipment failure, service to BS 311 can be maintained. It should be understood that additional reverse and forward link communications could be carried over backup wireless links 350-351, or only a portion thereof. Also, backup wireless links 350-351 could be used at the same time, whereby the forward traffic of BS 311 is exchanged over wireless link 350 and the reverse traffic of BS 311 is exchanged over wireless link 351, although other configurations could be employed.

In some examples, backup wireless links 350-351 are bandwidth asymmetric, with more bandwidth directed for the offloaded communications transferred towards the initiating one of the base stations than directed for the offloaded communications transferred away from the initiating base station. Thus, more bandwidth is available for communications transferred to the node initiating the backup wireless link than is available for communications transferred from the node initiating the backup wireless link. In many examples, the backup wireless link is established by the initiating base station as an end-user wireless link, similar to a wireless link used by a user device or wireless communication device. The base stations may contain additional wireless communication equipment, such as the circuitry, antenna, or other equipment normally associated with an end-user device in order to establish a backup wireless link. The base stations may also contain processing equipment, routers, or other equipment to route communications normally exchanged over a backhaul link over a backup wireless link.

In further examples, the selected donor base station could indicate to RNC 330 that it does not wish to be used as a donor base station. This desire could be indicated by a message transferred to RNC 330 in response to the instruction to initiate a backup wireless link, or merely by ignoring the instruction. In yet further examples, additional donor base stations could be selected, and a portion of the communications traffic normally carried over backhaul link 321 could be distributed across multiple backup wireless links between the additional donor base stations and BS 311. The portion or amount of communications traffic transferred to or received through the multiple donor base stations by BS 311 could be determined by the available resources or utilization of each donor base station, such as the wireless resources or backhaul resources.

Figure 6:
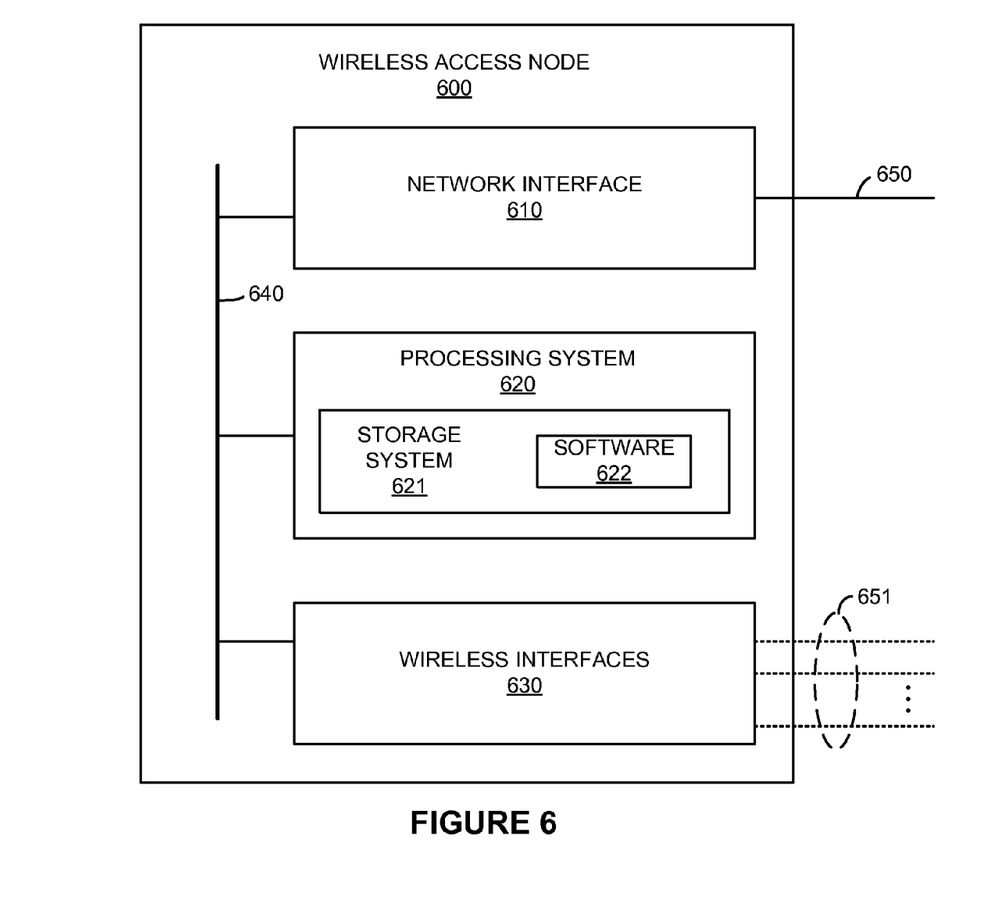
FIG. 6 is a block diagram illustrating a wireless access node.

FIG. 6 is a block diagram illustrating wireless access node 600, as an example of wireless access nodes 131-132 found in FIG. 1 or base stations 310-315 found in FIG. 3, although wireless access nodes 131-132 or base stations 310-315 could use other configurations. Wireless access node 600 includes network interface 610, processing system 620, and access interfaces 630. Network interface 610, processing system 620, and access interfaces 630 communicate over bus 640. Wireless access node 600 may be distributed among multiple devices that together form elements 610, 620-622, 630, 640, and 650-651.

Network interface 610 comprises network interfacing, router, or gateway equipment for communicating with a network control system of a wireless communication provider, such as network control system 150 or RNC 330 over a backhaul link. Network interface 610 exchanges user communications, overhead communications, and control instructions over backhaul link 650. Network interface 610 can also monitor performance of backhaul link 650 and receive instructions to initiate backup wireless links with other wireless access nodes. Backhaul link 650 could use various protocols or communication formats as described herein for backhaul links 140, 143, or 320-325, including combinations, variations, or improvements thereof.

Processing system 620 includes storage system 621. Processing system 620 retrieves and executes software 622 from storage system 621. In some examples, processing system 620 is located within the same equipment in which network interface 610 or access interfaces 630 are located. Storage system 621 could include a computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs processing system 620 to operate as described herein, such as route communications between user devices and a core network and network control systems, as well as initiate wireless links with user devices or other wireless access nodes. In some examples, processing system 620 monitors performance of backhaul link 650 and stores performance information of backhaul link 650 in storage system 621.

Access interfaces 630 comprise communication interfaces for communicating with user devices and other wireless access nodes over wireless links. Access interfaces 630 could include transceiver equipment and antenna elements for exchanging user communications and overhead communications with user devices and other wireless access nodes in a wireless communication system, omitted for clarity, over links 651. Access interfaces 630 also initiate wireless links with user devices or other wireless access nodes. In some examples, two or more of links 651 are used to communicate with a single user device or wireless access node. Access interfaces 630 also receive command and control information and instructions from processing system 620 for controlling the operations of user devices over links 651, as well as for coordinating handoffs of user devices between other wireless access nodes. Links 651 could each use various protocols or communication formats as described herein for wireless links 120-121 or 350-351, including combinations, variations, or improvements thereof.

Bus 640 comprises a physical, logical, or virtual communication link, capable of communicating data, control signals, and communications, along with other information. In some examples, bus 640 is encapsulated within the elements of network interface 610, processing system 620, or access interfaces 630, and may be a software or logical link. In other examples, bus 640 uses various communication media, such as air, space, metal, optical fiber, or some other signal propagation path, including combinations thereof. Bus 640 could be a direct link or might include various equipment, intermediate components, systems, and networks.

Figure 7:
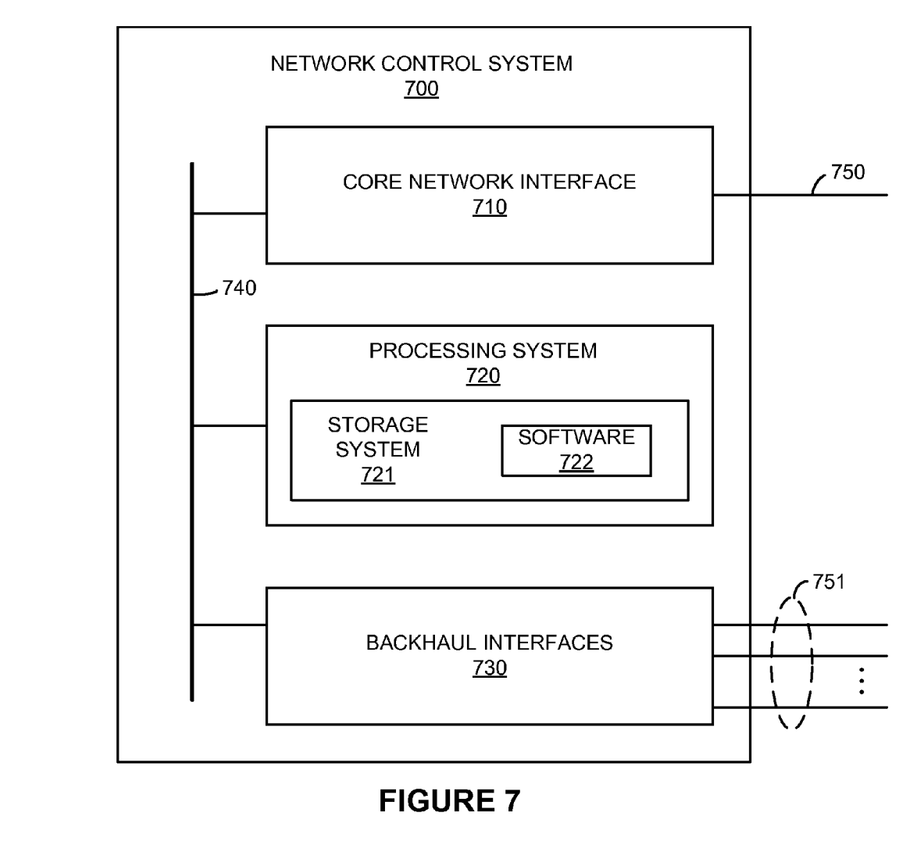
FIG. 7 is a block diagram illustrating a network control system.

FIG. 7 is a block diagram illustrating network control system 700, as an example of network control system 150 found in FIG. 1 or RNC 330 found in FIG. 3, although network control system 150 or RNC 330 could use other configurations. Network control system 700 includes core network interface 710, processing system 720, and backhaul interfaces 730. Core network interface 710, processing system 720, and backhaul interfaces 730 communicate over bus 740. Network control system 700 may be distributed among multiple devices that together form elements 710, 720-722, 730, 740, and 750-751.

Core network interface 710 comprises network router and gateway equipment for communicating with a core network of a wireless communication provider, such as core network 160 or core network 340. Network interface 710 exchanges user communications and overhead communications with a core network of a wireless communication system, omitted for clarity, over link 750. Link 750 could use various protocols or communication formats as described herein for links 144 or 326, including combinations, variations, or improvements thereof.

Processing system 720 includes storage system 721. Processing system 720 retrieves and executes software 722 from storage system 721. In some examples, processing system 720 is located within the same equipment in which core network interface 710 or backhaul interfaces 730 are located. Storage system 721 could include a computer-readable medium such as a disk, tape, integrated circuit, server, or some other memory device, and also may be distributed among multiple memory devices. Software 722 may include an operating system, logs, utilities, drivers, networking software, and other software typically loaded onto a computer system. Software 722 could contain an application program, firmware, or some other form of computer-readable processing instructions. When executed by processing system 720, software 722 directs processing system 720 to operate as described herein, such as monitoring performance of backhaul interfaces 730, storing performance information with storage system 721, selecting wireless access nodes to assist other wireless access nodes, and determining instructions for wireless access nodes to initiate backup wireless links.

Backhaul interfaces 730 comprises multiple communication interfaces, each for communicating with a wireless access node. Backhaul interfaces 730 could include network router and gateway equipment for exchanging user communications and overhead communications with wireless access nodes of a wireless communication system, omitted for clarity, over links 751. Backhaul interfaces 730 also receive command and control information from processing system 720 for controlling the operations of wireless access nodes over links 751, instructing wireless access nodes to initiate backup wireless links, monitoring performance of links 751, and coordinating handoffs of user devices between various wireless access nodes. Links 751 could each use various protocols or communication formats as described herein for links 140, 143, or 320-325, including combinations, variations, or improvements thereof.

Bus 740 comprises a physical, logical, or virtual communication link, capable of communicating data, control signals, and communications, along with other information. In some examples, bus 740 is encapsulated within the elements of core network interface 710, processing system 720, or backhaul interfaces 730, and may be a software or logical link. In other examples, bus 740 uses various communication media, such as air, space, metal, optical fiber, or some other signal propagation path, including combinations thereof. Bus 740 could be a direct link or might include various equipment, intermediate components, systems, and networks.

Referring back to FIG. 1, user device 110 comprises a wireless communication device which could include radio frequency (RF) communication circuitry and antenna elements. The RF communication circuitry typically includes amplifiers, filters, modulators, and signal processing circuitry. In many examples, user device 110 includes circuitry and equipment to exchange communications of wireless communication services over wireless links, such as wireless link 120. User device 110 may also include user interface systems, memory devices, computer-readable storage media, software, processing circuitry, or some other communication components. User device 110 may be a telephone, mobile wireless telephone, computer, e-book, mobile Internet appliance, wireless network interface card, media player, game console, or some other wireless communication apparatus, including combinations thereof.

Wireless access nodes 131-132 each comprise RF communication and control circuitry and an antenna. The RF communication circuitry typically includes amplifiers, filters, RF modulators, and signal processing circuitry. In many examples, wireless access nodes 131-132 each include equipment to provide wireless communication services to user devices over wireless links, such as user device 110, and route communications between core network 160 and user devices. In further examples, wireless access nodes 131-132 each include equipment to initiate and establish wireless links with each other or other wireless access nodes. Wireless access nodes 131-132 may also each comprise a router, server, memory device, software, processing circuitry, cabling, power supply, network communication interface, physical structural support, or some other communication apparatus. Wireless access nodes 131-132 could each be a base station, base transceiver station, Internet access node, telephony service node, wireless data access point, or some other wireless communication system, including combinations thereof. In typical examples, wireless access nodes 131-132 each have a limited geographic coverage area over which they can provide communication services to user devices and communicate with other wireless access nodes.

Network control system 150 includes equipment to route communications between core network 160 and user device 110 through wireless access nodes 131-132. Network control system 150 also includes equipment to control the operations of wireless access nodes 131-132 and instruct wireless access nodes 131-132 to initiate communication sessions over wireless links with other wireless access nodes. Network control system 150 could include base station controllers (BSC), mobile switching centers (MSC), radio node controllers (RNC), call processing systems, authentication, authorization and accounting (AAA) equipment, access service network gateways (ASN-GW), telephony service nodes, or other wireless communication systems, including combinations thereof. Network control system 150 may also comprise routers, servers, memory devices, software, processing circuitry, cabling, network communication interfaces, or other communication apparatuses.

Core network 160 comprises the core network of a wireless communications provider, and could include routers, gateways, telecommunication switches, processing systems, or other communications equipment and systems for providing communication and data services to user devices. In the example shown in FIG. 1, core network 160 provides communication services to user device 110 through network controller system 150 and wireless access nodes 131-132. Core network 160 may also comprise optical networks, asynchronous transfer mode (ATM) networks, packet networks, metropolitan-area networks (MAN), or other network topologies, equipment, or systems, including combinations thereof. In some examples, core network 160 includes further network control systems, wireless access nodes, and associated equipment for providing communication services to many user devices across a geographic region.

Wireless links 120-121 each use the air or space as the transport media. Wireless links 120-121 may each use various protocols, such as Code Division Multiple Access (CDMA), Evolution Data Optimized (EV-DO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof.

Communication links 140, 143-144 each use metal, glass, optical, air, space, or some other material as the transport media. Communication links 140, 143-144 could each use various communication protocols, such as Time Division Multiplex (TDM), asynchronous transfer mode (ATM), Internet Protocol (IP), Ethernet, synchronous optical networking (SONET), Data Over Cable Service Interface Specification (DOCSIS), circuit-switched, communication signaling, or some other communication format, including combinations, improvements, or variations thereof.

Links 120-121, 140-144 may each include many different signals sharing the same link—as represented by the associated lines in FIG. 1—comprising access channels, forward links, reverse links, user communications, communication sessions, overhead communications, frequencies, channels, carriers, timeslots, transportation ports, logical transportation links, network sockets, packets, or communication directions. Communication links 140-144 could each be direct links or may include intermediate networks, systems, or devices. In many examples, the portion of wireless link 120 as transmitted by user device 110 is referred to an uplink or reverse link of the wireless link, while the portion as transmitted by wireless access node 131 is referred to as a downlink or forward link of the wireless link.

FIGS. 1-7 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system comprising wireless access nodes and a network control system, wherein user devices and the wireless access nodes communicate over wireless links, and wherein the wireless access nodes and the network control system communicate over individually associated backhaul links, the method comprising:

transferring forward communications in a forward direction from the network control system to a first one of the wireless access nodes over a forward link portion of a first backhaul link associated with the first wireless access node, and transferring reverse communications in a reverse direction from the first wireless access node to the network control system over a reverse link portion of the first backhaul link;

monitoring forward performance of the forward link portion and monitoring reverse performance of the reverse link portion;

when the forward performance of the forward link portion exceeds a forward threshold, then identifying a second of the wireless access nodes to assist the first wireless access node and instructing the first wireless access node to initiate a first backup wireless link between the first wireless access node and the second wireless access node;

when the reverse performance of the reverse link portion exceeds a reverse threshold, then identifying a third of the wireless access nodes to assist the first wireless access node and instructing the third wireless access node to initiate a second backup wireless link between the first wireless access node and the third wireless access node; and using ones of the first backup wireless link and the second backup wireless link to offload communications of the first backhaul link.

2. The method of claim 1, wherein each of the first and second backup wireless links are bandwidth asymmetric with more bandwidth directed for the offloaded communications transferred towards the initiating one of the wireless access nodes than directed for the offloaded communications transferred away from the initiating wireless access node.

3. The method of claim 1, wherein using ones of the first backup wireless link and the second backup wireless link to offload the first backhaul link comprises, when the reverse performance of the reverse link portion exceeds the reverse threshold, transferring additional reverse communications from the first wireless access node to the third wireless access node over the second backup wireless link and transferring the additional reverse communications from the third wireless access node to the network control system over a third backhaul link associated with the third wireless access node.

4. The method of claim 1, wherein using ones of the first backup wireless link and the second backup wireless link to offload the first backhaul link comprises, when the forward performance of the forward link portion exceeds the forward threshold, transferring additional forward communications from the network control system to the second wireless access node over a second backhaul link associated with the second wireless access node and transferring the additional forward communications from the second wireless access node to the first wireless access node over the first backup wireless link.

5. The method of claim 1, wherein identifying the second and the third of the wireless access nodes to assist the first wireless access node comprises:
   initiating individual test wireless links between the first wireless access node and each of a subset of the wireless access nodes on a periodic basis;
   probing wireless link performance of each of the test wireless links to gather test wireless link performance data for each of the test wireless links; and
   selecting ones of the second and the third wireless access node from the subset of the wireless access nodes based on the test wireless link performance data.

6. The method of claim 5, wherein probing wireless link performance of each of the test wireless links comprises:
   probing forward performance of each of the test wireless links by transferring sample forward data from each of the subset of wireless access nodes to the first wireless access node; and
   probing reverse performance of each of the test wireless links by transferring sample reverse data from the first wireless access node to each of the subset of wireless access nodes.

7. The method of claim 6, wherein selecting ones of the second and the third wireless access node from the subset of the wireless access nodes based on the test wireless link performance data comprises:
   when the forward performance of the forward link portion of the first backhaul link exceeds the forward threshold, then selecting the second wireless access node from the subset of the wireless access nodes based upon the forward performance of each of the test wireless links;
   when the reverse performance of the reverse link portion of the first backhaul link exceeds the reverse threshold, then selecting the third wireless access node from the subset of the wireless access nodes based upon the reverse performance of each of the test wireless links.

8. The method of claim 5, wherein the subset of the wireless access nodes comprise wireless access nodes proximately located to the first wireless access node.

9. The method of claim 1, further comprising:
   identifying a fourth of the wireless access nodes to assist the first wireless access node;
   when the forward performance of the forward link portion exceeds the forward threshold, then instructing the first wireless access node to initiate an additional backup wireless link between the first wireless access node and the fourth wireless access node;
   when the reverse performance of the reverse link portion exceeds the reverse threshold, then instructing the fourth wireless access node to initiate the additional backup wireless link between the first wireless access node and the fourth wireless access node; and
   using ones of the first and the second backup wireless links and the additional backup wireless link to offload communications of the first backhaul link.

10. The method of claim 1, wherein the associated first or second backup wireless link is established as an end-user wireless link by the initiating one of the wireless access nodes.

11. A communication system, comprising:
   wireless access nodes and a network control system, wherein user devices and the wireless access nodes are configured to communicate over wireless links, and wherein the wireless access nodes and the network control system are configured to communicate over individually associated backhaul links;
   the network control system configured to transfer forward communications in a forward direction from the network control system to a first one of the wireless access nodes over a forward link portion of a first backhaul link associated with the first wireless access node;
   the first wireless access node configured to transfer reverse communications in a reverse direction from the first wireless access node to the network control system over a reverse link portion of the first backhaul link;
   the network control system configured to monitor forward performance of the forward link portion and monitor reverse performance of the reverse link portion;
   when the forward performance of the forward link portion exceeds a forward threshold, then the network control system is configured to identify a second of the wireless access nodes to assist the first wireless access node and instruct the first wireless access node to initiate a first backup wireless link between the first wireless access node and the second wireless access node to offload communications of the first backhaul link; and
   when the reverse performance of the reverse link portion exceeds a reverse threshold the network control system is configured to identify a third of the wireless access nodes to assist the first wireless access node and instruct the third wireless access node to initiate a second backup wireless link between the first wireless access node and the third wireless access node to offload communications of the first backhaul link.

12. The communication system of claim 11, wherein each of the first and second backup wireless links are bandwidth asymmetric with more bandwidth directed for the offloaded communications transferred towards the initiating one of the wireless access nodes than directed for the offloaded communications transferred away from the initiating wireless access node.

13. The communication system of claim 11, wherein when the reverse performance of the reverse link portion exceeds the reverse threshold, the first wireless access node is configured to transfer additional reverse communications from the first wireless access node to the third wireless access node over the second backup wireless link, and the third wireless access node is configured to transfer the additional reverse communications from the third wireless access node to the network control system over a third backhaul link associated with the third wireless access node.

14. The communication system of claim 11, wherein when the forward performance of the forward link portion exceeds the forward threshold, the network control system is configured to transfer additional forward communications from the network control system to the second wireless access node over a second backhaul link associated with the second wireless access node, and the second wireless access node is configured to transfer the additional forward communications from the second wireless access node to the first wireless access node over the first backup wireless link.

15. The communication system of claim 11, comprising:
the network control system configured to initiate individual test wireless links between the first wireless access node and each of a subset of the wireless access nodes on a periodic basis, probe wireless link performance of each of the test wireless links to gather test wireless link performance data for each of the test wireless links, and select ones of the second and the third wireless access nodes from the subset of the wireless access nodes based on the test wireless link performance data.

16. The communication system of claim 15, wherein the network control system is configured to probe forward performance of each of the test wireless links by transferring sample forward data from each of the subset of wireless access nodes to the first wireless access node, and probe reverse performance of each of the test wireless links by transferring sample reverse data from the first wireless access node to each of the subset of wireless access nodes.

17. The communication system of claim 16, wherein when the forward performance of the forward link portion of the first backhaul link exceeds the forward threshold, then the network control system is configured to select the second wireless access node from the subset of the wireless access nodes based upon the forward performance of each of the test wireless links, and when the reverse performance of the reverse link portion of the first backhaul link exceeds the reverse threshold, then the network control system is configured to select the third wireless access node from the subset of the wireless access nodes based upon the reverse performance of each of the test wireless links.

18. The communication system of claim 15, wherein the subset of the wireless access nodes comprise wireless access nodes proximately located to the first wireless access node.

19. The communication system of claim 11, comprising:
the network control system configured to identify a fourth of the wireless access nodes to assist the first wireless access node, wherein when the forward performance of the forward link portion exceeds the forward threshold, then the network control system is configured to instruct the first wireless access node to initiate an additional backup wireless link between the first wireless access node and the fourth wireless access node to offload communications of the first backhaul link in conjunction with the first backup wireless link, and when the reverse performance of the reverse link portion exceeds the reverse threshold, then the network control system is configured to instruct the fourth wireless access node to initiate the additional backup wireless link between the first wireless access node and the fourth wireless access node to offload communications of the first backhaul link in conjunction with the second backup wireless link.

20. The communication system of claim 11, wherein the initiating one of the wireless access nodes is configured to establish the associated first or second backup wireless link as an end-user wireless link.

* * * * *